United States Patent
Love et al.

(10) Patent No.: US 11,141,032 B2
(45) Date of Patent: *Oct. 12, 2021

(54) AUTONOMOUS VACUUM

(71) Applicant: Techtronic Industries Co. Ltd., New Territories (HK)

(72) Inventors: Alan Love, Chesterfield, OH (US); Sergey Makarov, Solon, OH (US); Shadi Sumrain, Hudson, OH (US); Patrick Truitt, Hudson, OH (US)

(73) Assignee: Techtronic Industries Co. Ltd., New Territories (HK)

( * ) Notice: Subject to any disclaimer, the term of this patent is extended or adjusted under 35 U.S.C. 154(b) by 402 days.

This patent is subject to a terminal disclaimer.

(21) Appl. No.: 16/199,835

(22) Filed: Nov. 26, 2018

(65) Prior Publication Data

US 2019/0090706 A1    Mar. 28, 2019

Related U.S. Application Data

(63) Continuation of application No. 15/621,612, filed on Jun. 13, 2017, now Pat. No. 10,136,784, which is a (Continued)

(51) Int. Cl.
*A47L 9/16* (2006.01)
*G01S 17/931* (2020.01)
(Continued)

(52) U.S. Cl.
CPC .............. *A47L 9/1608* (2013.01); *A47L 5/22* (2013.01); *A47L 9/00* (2013.01); *A47L 9/009* (2013.01);
(Continued)

(58) Field of Classification Search
CPC ........ A47L 9/1608; A47L 5/22; A47L 9/0411; A47L 9/0477; A47L 9/1666;
(Continued)

(56) References Cited

U.S. PATENT DOCUMENTS 6,553,612 B1    4/2003  Dyson et al.
8,117,712 B2    2/2012  Dyson et al.
(Continued)

FOREIGN PATENT DOCUMENTS

EP    1797809 A2    6/2007
GB    2344778 A     6/2000
(Continued)

OTHER PUBLICATIONS

Chinese Patent Office Action for Application No. 201580074564.2 dated Feb. 2, 2019, with English translation, 14 pages.
(Continued)

*Primary Examiner* — David Redding
(74) *Attorney, Agent, or Firm* — Michael Best & Friedrich LLP

(57) ABSTRACT

An autonomous vacuum cleaner operable to navigate about a surrounding environment to perform a surface cleaning operation without continuous human input. The vacuum cleaner includes a suction nozzle and a suction motor and a fan assembly operable to generate an airflow through the vacuum cleaner from the suction nozzle through a debris separator to a clean air exhaust. The suction motor and the fan assembly having an axis of rotation and a fan of the fan assembly rotatable about the axis of rotation. The axis of rotation is orientated horizontally. The debris separator includes a cyclonic separator operable to separate debris from the airflow and the cyclonic separator includes a cylindrical wall along a longitudinal axis, the longitudinal axis of the cyclonic separator being orientated horizontally.

21 Claims, 17 Drawing Sheets

Related U.S. Application Data continuation of application No. PCT/US2015/066801, filed on Dec. 18, 2015.

(60) Provisional application No. 62/094,553, filed on Dec. 19, 2014.

(51) Int. Cl.
| | | |
|---|---|---|
| *A47L 9/04* | (2006.01) | |
| *A47L 9/28* | (2006.01) | |
| *A47L 9/10* | (2006.01) | |
| *A47L 9/00* | (2006.01) | |
| *A47L 5/22* | (2006.01) | |
| *A47L 9/12* | (2006.01) | |
| *A47L 9/24* | (2006.01) | |

(52) U.S. Cl.
CPC .......... *A47L 9/0411* (2013.01); *A47L 9/0477* (2013.01); *A47L 9/102* (2013.01); *A47L 9/122* (2013.01); *A47L 9/1666* (2013.01); *A47L 9/1683* (2013.01); *A47L 9/248* (2013.01); *A47L 9/2826* (2013.01); *A47L 9/2884* (2013.01); *G01S 17/931* (2020.01); *A47L 9/16* (2013.01); *A47L 9/1691* (2013.01); *A47L 2201/00* (2013.01); *A47L 2201/022* (2013.01); *A47L 2201/04* (2013.01)

(58) Field of Classification Search
CPC ...... A47L 9/1683; A47L 9/2884; A47L 9/102; A47L 9/16; A47L 9/1691; A47L 2201/022; A47L 2201/00; A47L 2201/04; A47L 11/00; A47L 11/40; A47L 11/4002; A47L 11/4013; A47L 11/4027; A47L 11/4061; A47L 11/4072; A47L 11/4094; G01S 17/931

See application file for complete search history.

(56) References Cited

U.S. PATENT DOCUMENTS

| | | | |
|---|---|---|---|
| 9,572,467 B2 | 2/2017 | Dyson et al. | |
| 10,136,784 B2 * | 11/2018 | Love | A47L 9/2826 |
| 2010/0037418 A1 * | 2/2010 | Hussey | B60L 15/2036 |
| | | | 15/319 |
| 2010/0229335 A1 * | 9/2010 | Conrad | A47L 9/1691 |
| | | | 15/412 |

FOREIGN PATENT DOCUMENTS

| | | |
|---|---|---|
| GB | 248775 A | 8/2012 |
| GB | 2494442 A | 3/2013 |

OTHER PUBLICATIONS

International Search Report and Written Opinion for Application No. PCT/US2015/066801 dated Apr. 8, 2016 (10 pages).

Chinese Patent Office Third Office Action for Application No. 201580074564.2 dated Aug. 5, 2020 (6 pages including statement of relevance).

Chinese Patent Office Second Office Action for Application No. 201580074564.2 dated Sep. 29, 2019 (8 pages including English summary).

* cited by examiner

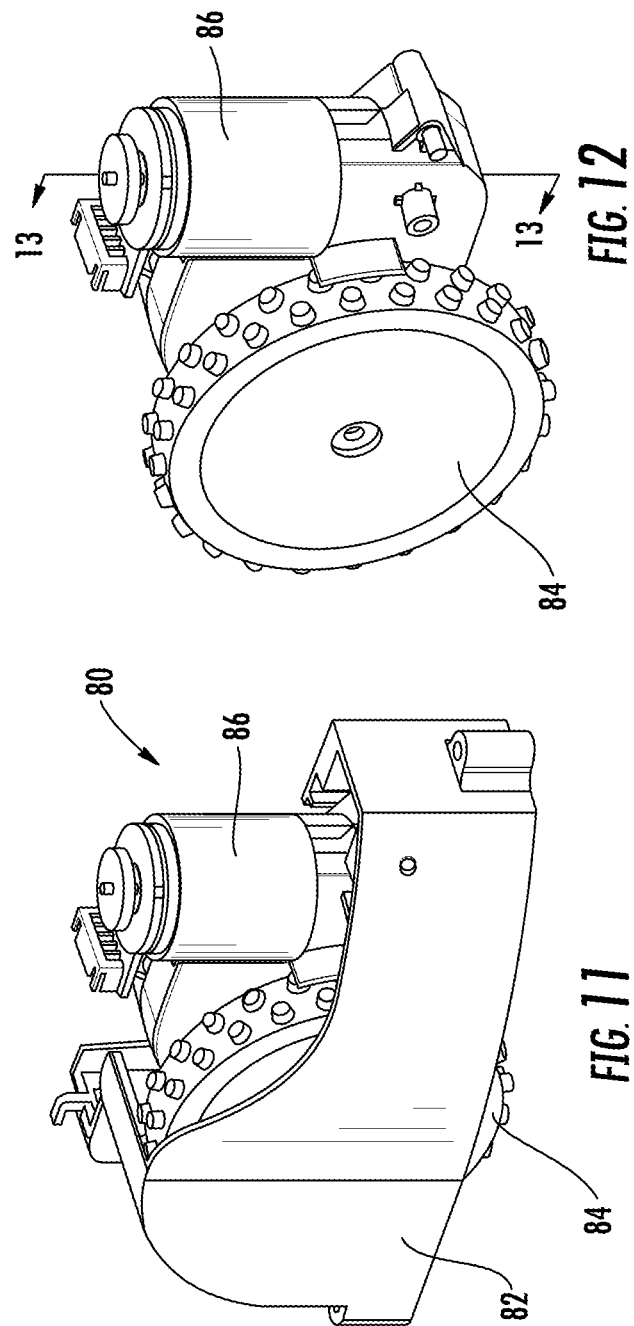

AUTONOMOUS VACUUM

CROSS-REFERENCE TO RELATED APPLICATIONS

This application is a continuation application of U.S. patent application Ser. No. 15/621,612, filed Jun. 13, 2017, which is a continuation application of International Patent Application No. PCT/US2015/066801, filed on Dec. 18, 2015, which claims priority to U.S. Provisional Patent Application No. 62/094,553, filed on Dec. 19, 2014, the contents all of which are hereby incorporated by reference in their entirety.

FIELD OF THE INVENTION

The present invention relates to a vacuum cleaner. More specifically, the present invention relates to an autonomous vacuum cleaner.

BACKGROUND OF THE INVENTION

A vacuum cleaner is generally known in the art. A vacuum cleaner is a cleaning device that creates a partial vacuum using air to suction dust, dirt, or other debris from a surface. The vacuum cleaner typically draws a combination of air and dust, dirt, or other debris into the cleaner through a floor nozzle. This "dirty air" typically enters a dust separator in the vacuum that separates the dust, dirt, or debris from the air. A bin or bag collects the separated dust, dirt, or debris separated from the air for later disposal. The resulting "clean air" exits the dust separator where it is exhausted from the vacuum cleaner.

SUMMARY OF THE INVENTION

The invention provides, in one aspect, an autonomous vacuum cleaner that includes an outer housing with one or more of a controller, a sensor, and an automatic wheel assembly operable in combination to sense a surrounding environment and to navigate about the surrounding environment to perform a surface cleaning operation without continuous human input, a suction nozzle, and a suction motor and a fan assembly operable to generate an airflow through the vacuum cleaner from the suction nozzle through a debris separator to a clean air exhaust. The suction motor and the fan assembly have an axis of rotation and a fan of the fan assembly is rotatable about the axis of rotation. The debris separator includes a cyclonic separator operable to separate debris from the airflow, the cyclonic separator being located within the housing. The cyclonic separator includes a cylindrical wall along a longitudinal axis, the cylindrical wall having a first end and a second end and, a dirty air inlet, a clean air outlet, a debris outlet adjacent the second end of the cylindrical wall, and a dust bin in fluid communication with the debris outlet of the cyclonic separator, where the cyclonic separator is coaxial with the motor and fan assembly.

The invention provides, in another aspect, an autonomous vacuum cleaner that includes an outer housing, and a separator assembly removably received by the autonomous vacuum cleaner, a portion of the separator assembly defines a portion of at least two walls of the outer housing.

Other features and aspects of the invention will become apparent by consideration of the following detailed description and accompanying drawings.

BRIEF DESCRIPTION OF THE DRAWINGS

FIG. 11 is an isometric view of a wheel assembly for use in the autonomous vacuum cleaner of FIG. 1.

FIG. 12 is an isometric view of the wheel assembly of FIG. 11 with a wheel housing removed.

Figure 1:
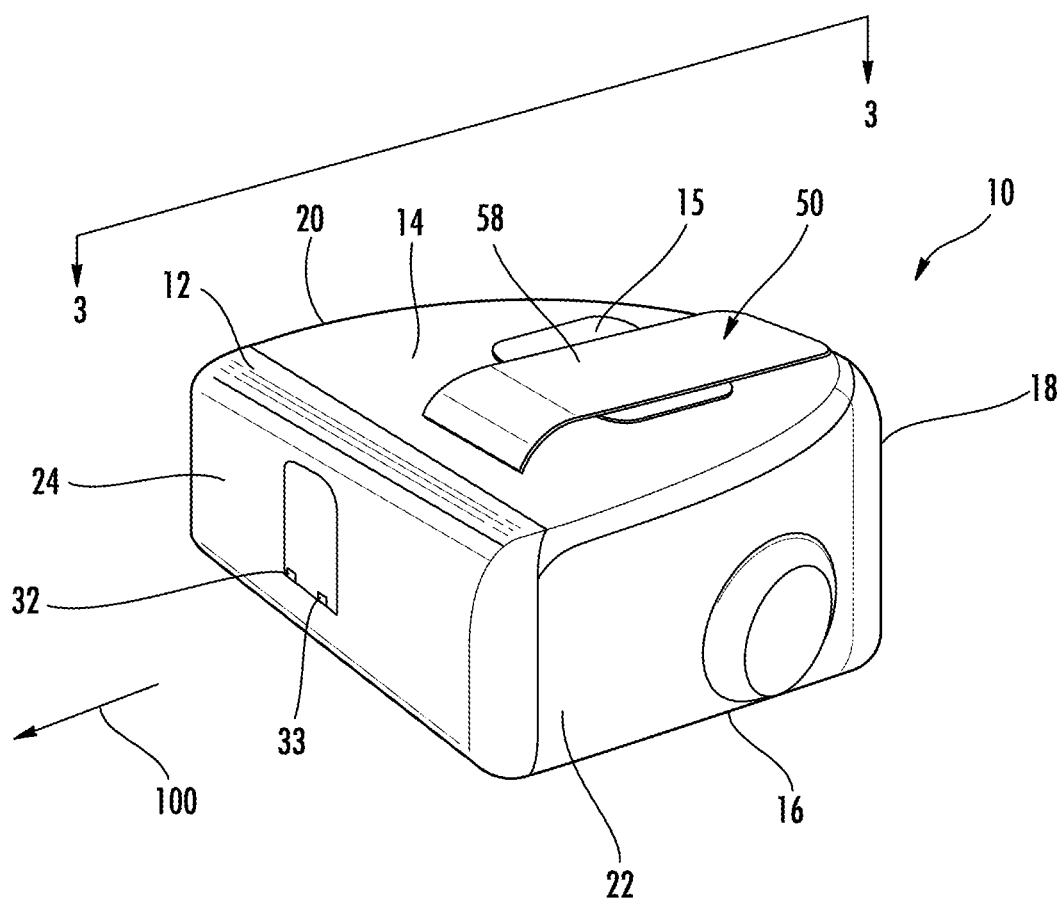
FIG. 1 is an isometric view of an autonomous vacuum cleaner in accordance with an embodiment of the invention.

Before any embodiments of the present invention are explained in detail, it should be understood that the invention is not limited in its application to the details or construction and the arrangement of components as set forth in the following description or as illustrated in the drawings. The invention is capable of other embodiments and of being practiced or of being carried out in various ways. It should be understood that the description of specific embodiments is not intended to limit the disclosure from covering all modifications, equivalents and alternatives falling within the spirit and scope of the disclosure. Also, it is to be understood that the phraseology and terminology used herein is for the purpose of description and should not be regarded as limiting.

DETAILED DESCRIPTION

The invention illustrated in the Figures and disclosed herein is generally directed to an autonomous vacuum cleaner 10, and more specifically components provided in the autonomous vacuum cleaner 10 that improve operation over known autonomous vacuum cleaners. The autonomous vacuum cleaner 10 is a robot vacuum cleaner that includes one or more controllers, sensors, and automatic wheel assemblies operable in combination to sense a surrounding environment and navigate about the environment to perform a surface cleaning operation without continuous human input.

For ease of discussion and understanding, the following detailed description will refer to a separator 54, but illustrates a cyclone separator oriented horizontally. It should be appreciated that the invention is not limited to a cyclone or cyclonic type separator, but may employ any suitable dust separation device. In addition, the separator 54 may be oriented horizontally (as illustrated), vertically, or in any other orientation.

It should be appreciated that the term direction of travel 100 is directed to the direction the autonomous vacuum cleaner 10 travels when one or more powered wheels are operational. Accordingly, the direction of travel 100 may be a straight line when all powered wheels are operational, or may be a curve when one or more powered wheels are operational.

It should also be appreciated that the term "dust" is directed to dust, dirt, particulate, debris, or any other material that may be drawn into the autonomous vacuum cleaner 10 with air as dirty air. In addition, the term "surface" may include carpeting, flooring, concrete, or any other material from which the autonomous vacuum cleaner 10 may remove dust from.

Referring now to the Figures, FIGS. 1-13 illustrate an embodiment of the autonomous vacuum cleaner 10. As illustrated in FIG. 1, the autonomous vacuum cleaner 10 includes a housing or outer housing 12 that encloses or partially encloses components of the autonomous vacuum cleaner 10. The housing 12 includes a top portion or wall 14 opposite a bottom portion or wall 16. Between the top and bottom portions 14, 16 is an arcuate portion or wall 18. The arcuate portion 18 is a curved portion that connects a first side portion or wall 20 (see FIG. 3) to a second side portion or wall 22 (see also FIG. 3). The first and second side portions 20, 22 oppose one another, and further are approximately parallel to each other. However, in other embodiments, the first and second sides 20, 22 may be non-parallel to each other. A front portion or wall 24 extends between the first and second side portions 20, 22 and is provided opposite the arcuate portion 18. The front portion 24 is illustrated as approximately perpendicular to a direction of travel 100 (shown in FIGS. 1 and 3). In other embodiments, the front portion 24 may be arranged at any suitable angle or have any shape relative to the direction of travel 100.

Figure 2:
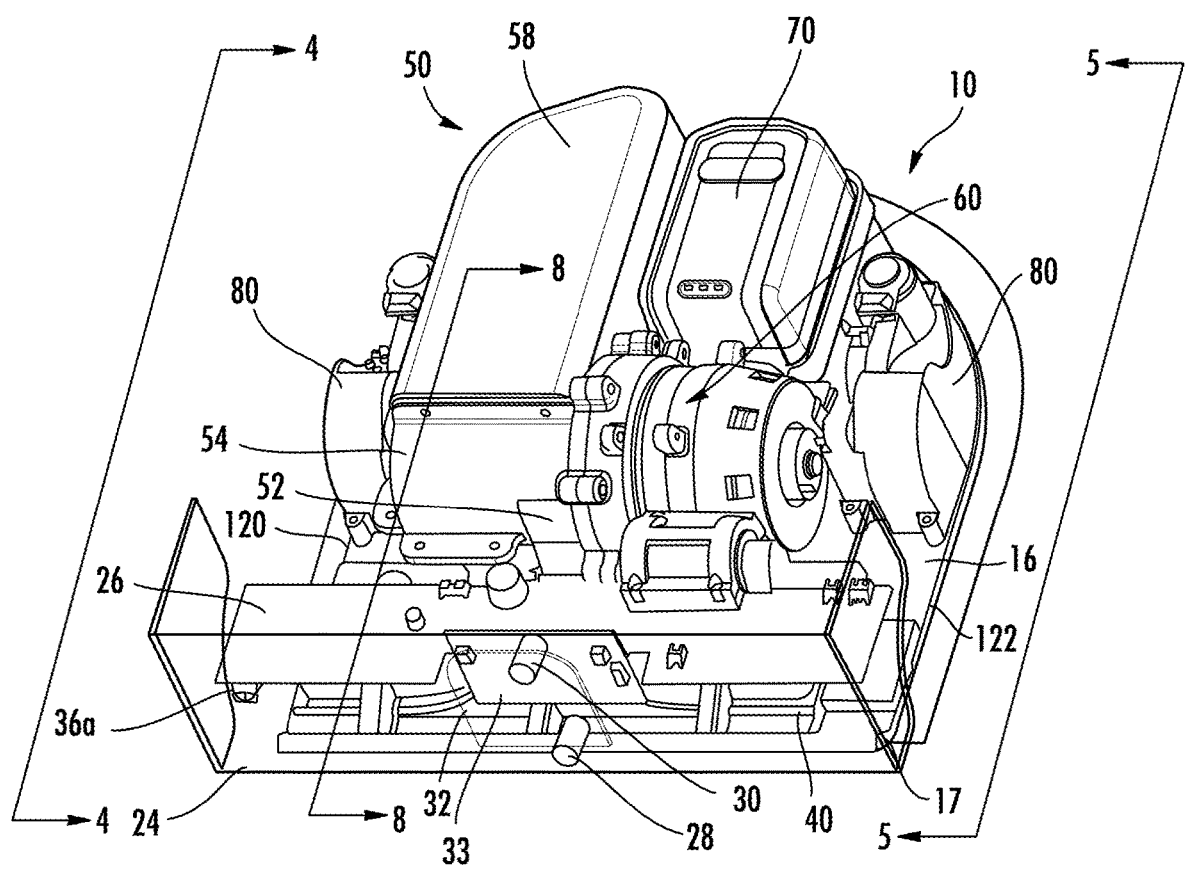
FIG. 2 is an isometric view of the autonomous vacuum cleaner of FIG. 1, with a portion of the housing removed to illustrate the layout of certain internal components.
Figure 4:
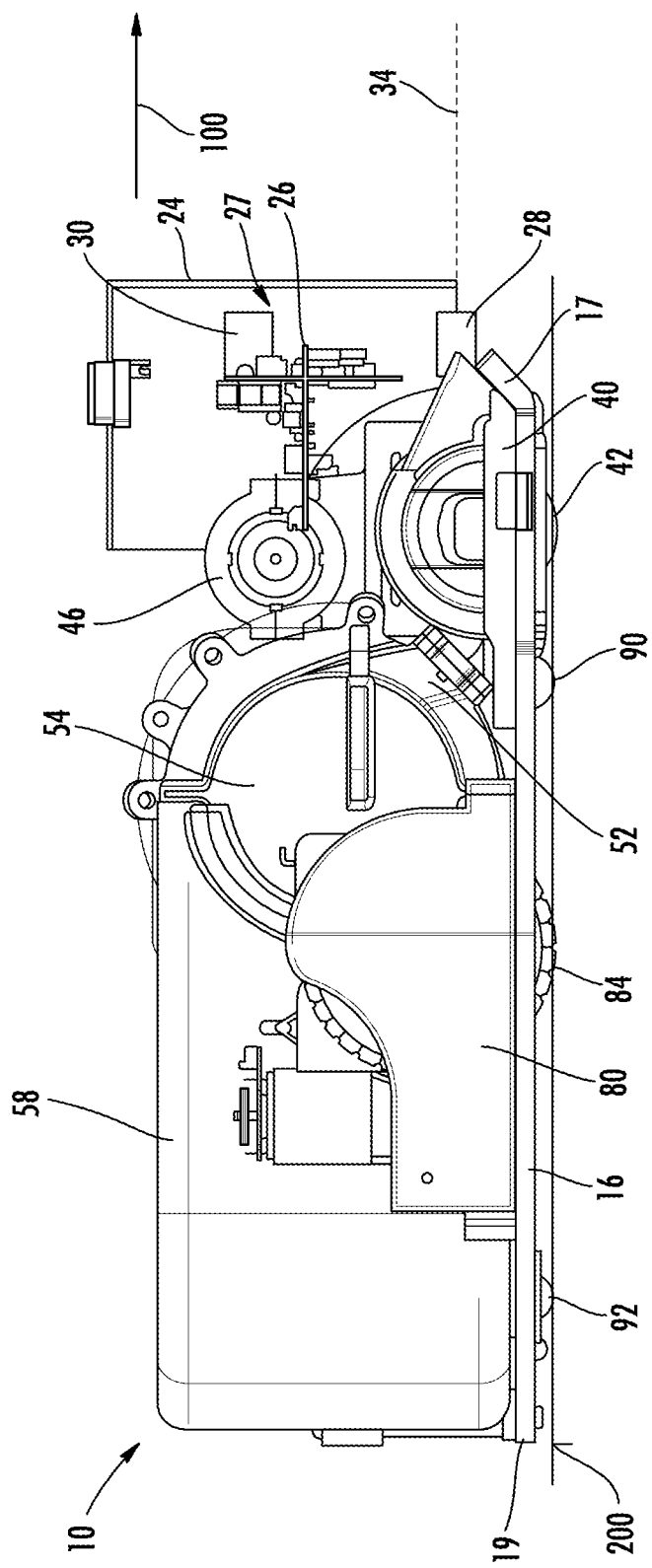
FIG. 4 is a first side view of the autonomous vacuum cleaner of FIG. 1, taken along line 4-4 of FIG. 2, with a portion of the housing removed to illustrate the layout of certain internal components.
Figure 5:
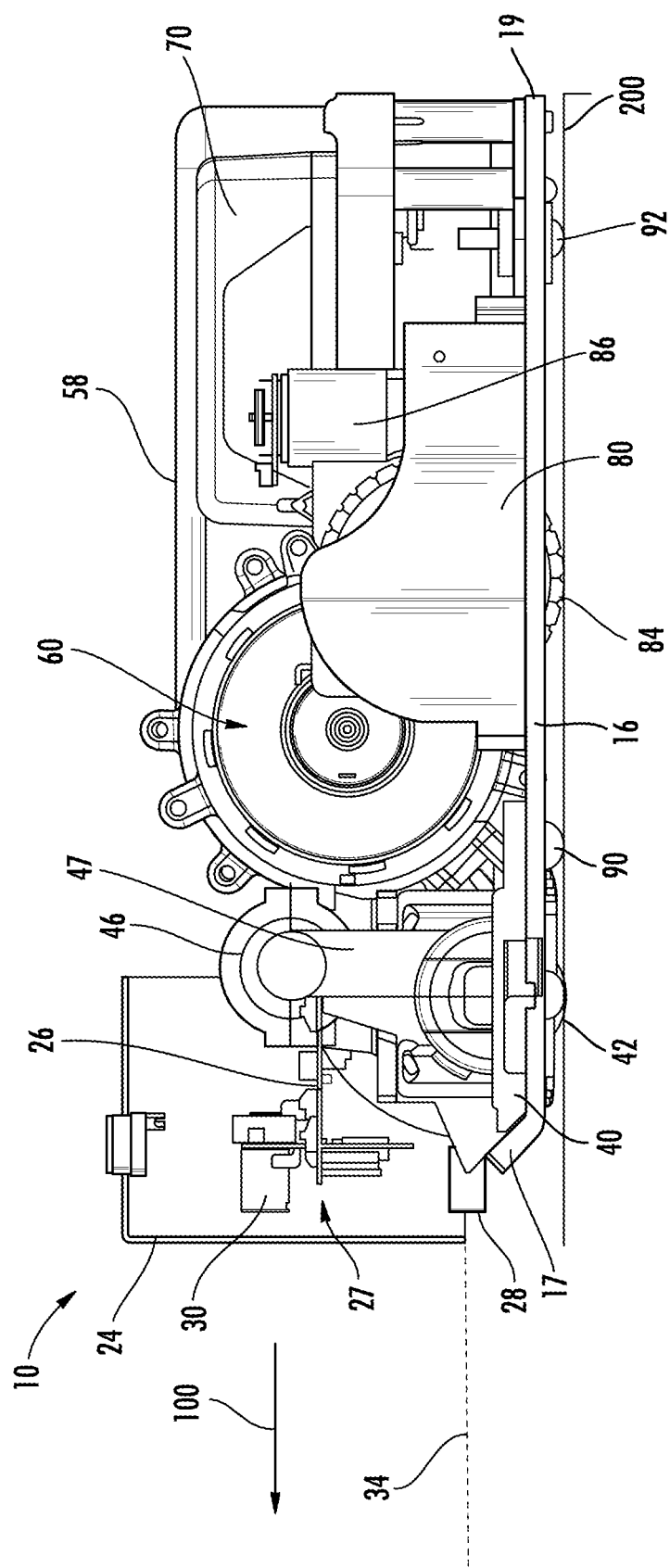
FIG. 5 is a second side view of the autonomous vacuum cleaner of FIG. 1, taken along line 5-5 of FIG. 2, with a portion of the housing removed to illustrate the layout of certain internal components.

Referring now to FIGS. 2, 4, and 5, the autonomous vacuum cleaner 10 is shown with a portion of the housing 12 removed to illustrate internally housed components. Specifically, the top portion 14, arcuate portion 18, first side portion 20, and second side portion 22 are all removed. The bottom portion 16 carries the internal components.

The front portion 24 houses a control unit 26, illustrated as a printed circuit board. The control unit 26 includes electronics, including processing components and instructions, to operate the autonomous vacuum cleaner 10 and internal components disclosed herein. The front portion 24 also houses a mapping assembly 27 (shown in FIGS. 4-6) that includes a mapping emitter 28 and a mapping receiver 30. The mapping emitter and receiver 28, 30 are vertically aligned in a plane approximately perpendicular with a ground or floor 200 (shown in FIGS. 4-5). The mapping receiver 30 is provided a known distance from the mapping emitter 28 to provide for triangulation to map an environment within which the autonomous vacuum cleaner 10 operates. While the illustrated mapping assembly 27 provides the emitter 28 at a position below the receiver 30 (i.e. the emitter 28 is closer to the floor 200 than the receiver 30), in other embodiments the emitter 28 may be at a position above the receiver 30 (i.e. the receiver 30 is closer to the floor 200 than the emitter 28).

The mapping emitter and receiver 28, 30 are in operational alignment with a window 32 (shown in FIGS. 1 and 2) provided in the front portion 24. The window 32 allows the signal from the mapping emitter 28 to be transmitted out of the autonomous vacuum cleaner 10, and for the corresponding return signal to be received by the mapping receiver 30 within the autonomous vacuum cleaner 10. In the illustrated embodiment, the window 32 includes a filter or optical filter 33 that filters the signal originating from the mapping emitter 28. Stated otherwise, only the wavelength of the signal from the mapping emitter 28 can exit through the filter 33, or return through the filter 33 to the mapping receiver 30. In other embodiments, the window 32 may be translucent, may not include any filter 33, or may merely be an aperture in the front portion 24.

Figure 6:
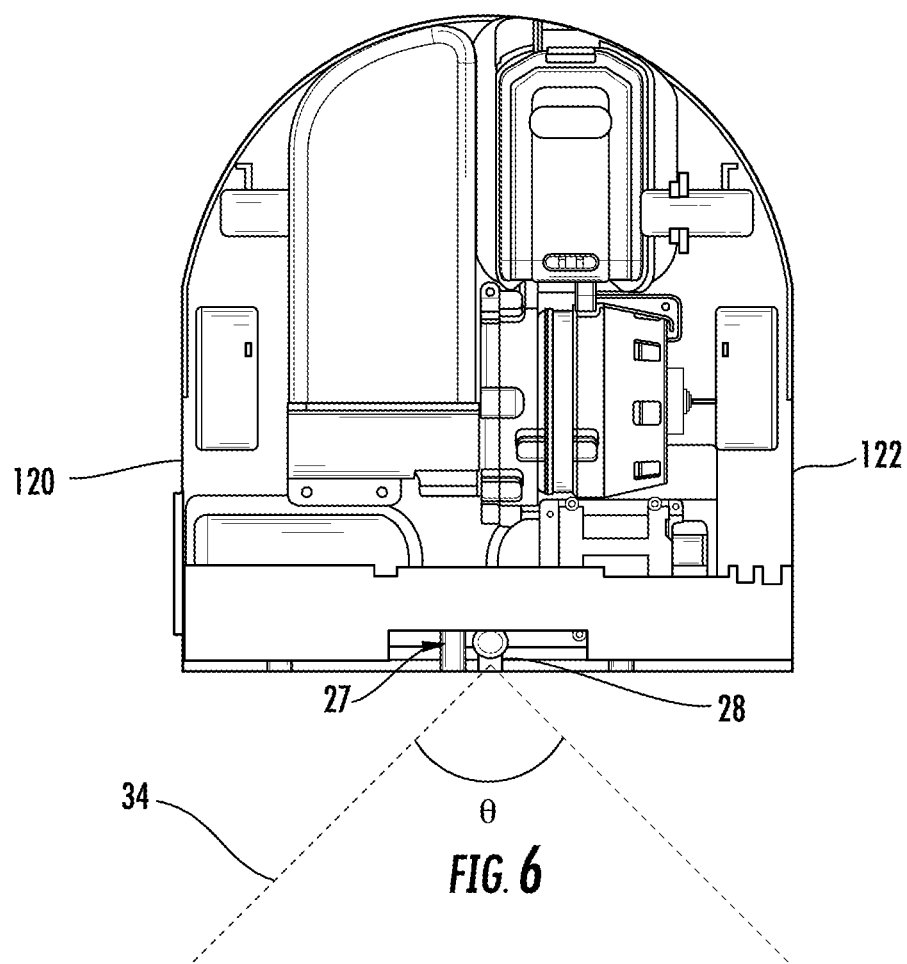
FIG. 6 is a plan view of the autonomous vacuum cleaner of FIG. 1, with a portion of the housing removed and illustrating an emission from a mapping emitter.

In the illustrated embodiment, the mapping emitter 28 is a laser emitter 28 that emits light 34 in a non-visible wavelength, and preferably at an infrared (IR) wavelength (or a wavelength between approximately 700 nanometers and 1000 nanometers). The emitter 28 emits light 34 in a generally forward direction, in a plane approximately parallel with the ground or floor 200 (shown in FIGS. 4-5). As shown in FIG. 6, the light 34 emitted from the mapping emitter 28 is in a horizontal band having an angle θ. Angle θ is approximately 120°, but in other embodiments may be more or less than approximately 120°. The emitted light 34 is reflected by objects in the field of view of the mapping receiver 30. The filter 33 allows the wavelength of reflected light 34 to pass through, but filters out light of other wavelengths. This allows the mapping receiver 30 to receive only the filtered wavelength of reflected light 34 and to use the reflected light 34 to generate a depth map of the field of view.

Figure 14:
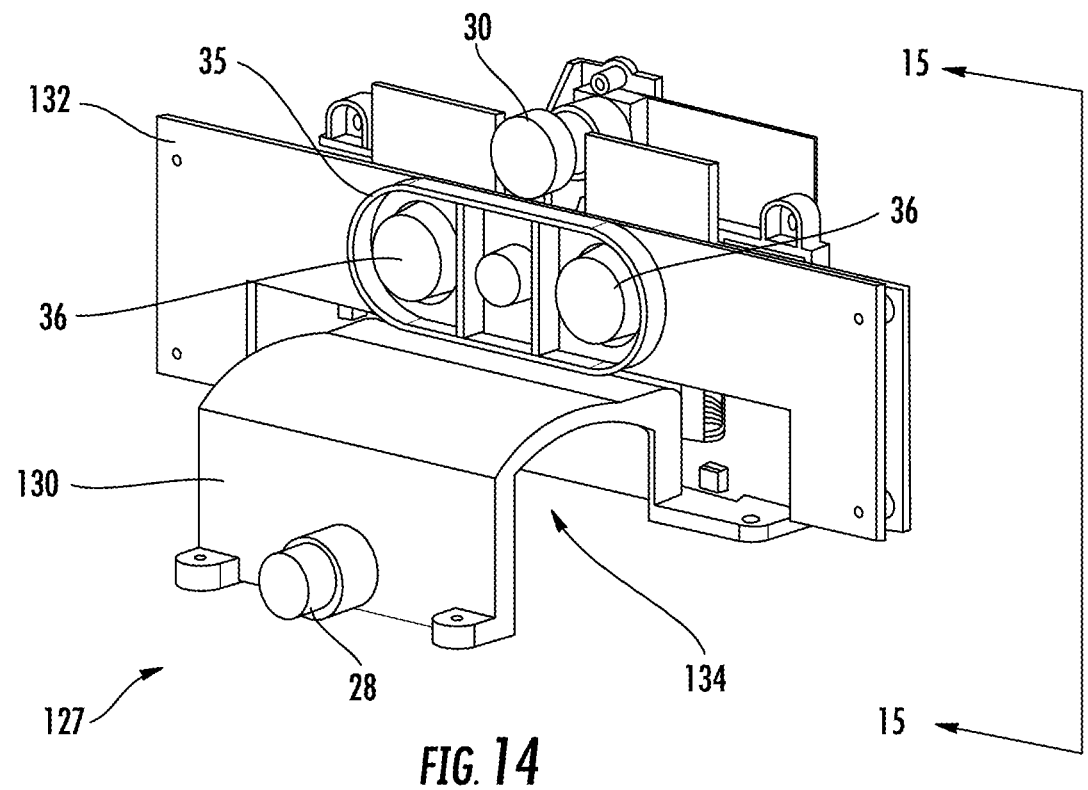
FIG. 14 is an isometric view of an alternative embodiment of a mapping assembly for use in the autonomous vacuum cleaner of FIG. 1.
Figure 15:
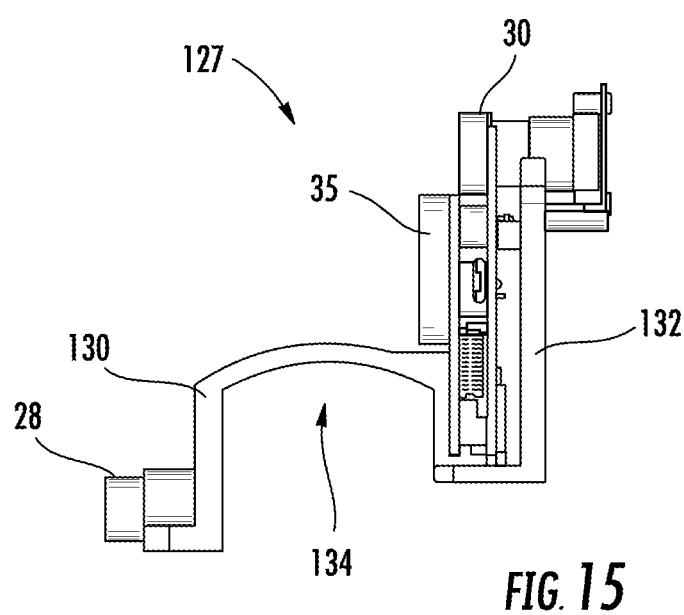
FIG. 15 is a side view of the mapping assembly of FIG. 14, taken along line 15-15 of FIG. 14.

FIGS. 14-15 illustrate an alternative embodiment of a mapping assembly 127. The mapping assembly 127 includes components that are substantially as described in association with mapping assembly 27, and like numbers have been used to illustrate like components. In this embodiment, the mapping assembly 127 includes a lower housing 130 coupled to an upper housing 132. The lower housing 130 carries the mapping emitter 28, while the upper housing 132 carries the mapping receiver 30. The lower housing 130 defines a channel 134 that receives a portion of a nozzle 40 (shown in FIGS. 4, 5, and 8). In some embodiments, a portion of a brush roll 42 within the nozzle 40 is also positioned in the channel 134. The mapping emitter 28 and mapping receiver 30 are provided in vertical alignment, however are horizontally offset. As shown in FIG. 15, the mapping emitter 28 is forward of the channel 134 while the mapping receiver 30 is rearward of the channel 134. The upper housing 132 also carries an object detection sensor assembly 35 that includes one or more object detection sensors 36. The object detection sensors 36 are illustrated as ultrasonic sensors 36, but may be any suitable sensor to detect an object or obstruction in the environment within which the autonomous vacuum cleaner 10 operates.

Referring back to FIG. 2, the front portion 24 also houses a pair of object detection sensors 36a, b. In the illustrated embodiment, the object detection sensors 36a, b are ultrasonic sensors 36a, b provided on the front portion 24, and may be near or offset from a first side 120 end of the front portion 24 and a second side 122 end of the front portion 24. Each of the ultrasonic sensors 36a, b emit an ultrasonic signal 38 that is reflected back to a receiver portion (not shown) on each sensor 36a, b to detect objects or potential obstructions in the direction of travel 100.

Figure 7:
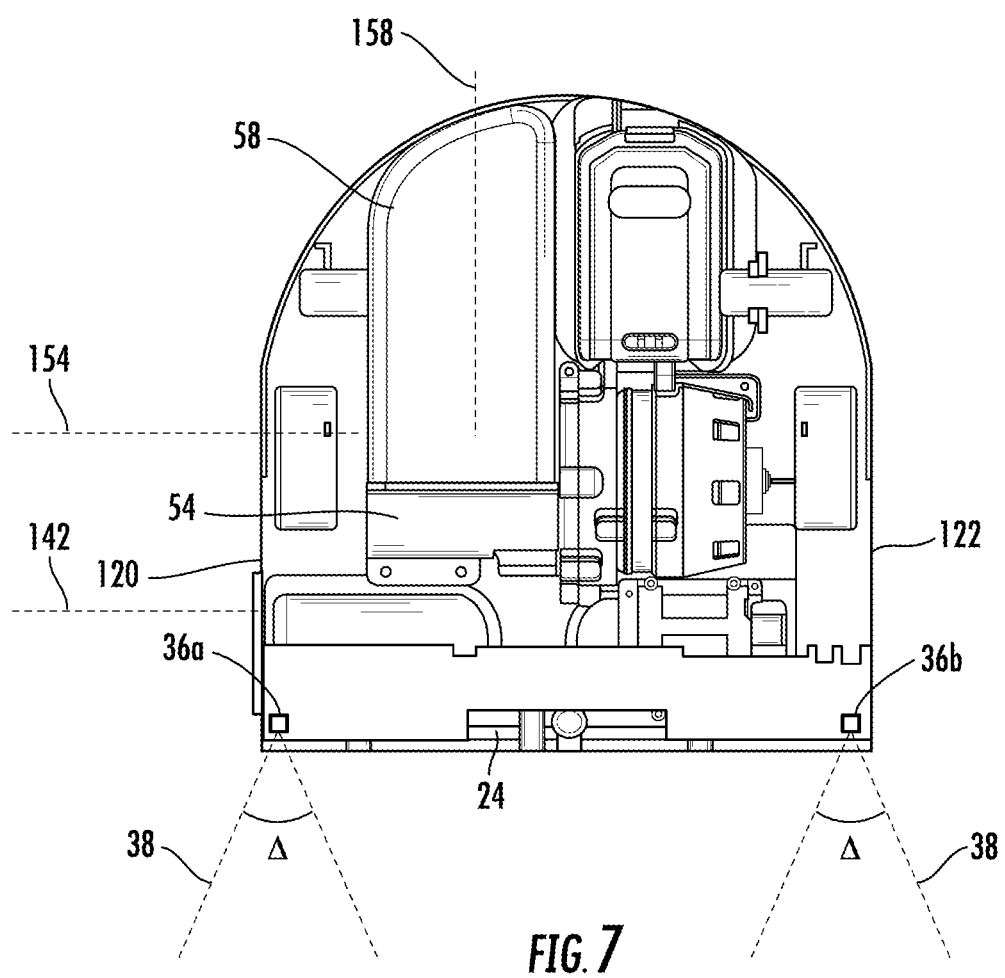
FIG. 7 is a plan view of the autonomous vacuum cleaner of FIG. 1, with a portion of the housing removed and illustrating emissions from object detection sensors.

FIG. 7 illustrates the ultrasonic signals 38. The ultrasonic signals 38 are emitted outward from each of the ultrasonic sensors 36a, b. The signals 38 are dispersed in a band having an angle $\Delta$. Angle $\Delta$ is approximately 60°, but in other embodiments may be more than or less than approximately 60°. The signals 38 intersect at an imaginary point (not shown) a distance away from the front portion 24 in the direction of travel 100. The distance the imaginary point (not shown) is from the front portion 24 depends on the distance the ultrasonic sensors 36a, b are spaced from one another and the angle $\Delta$. By spacing the sensors 36a, b from one another a desired distance to locate the imaginary point (not shown) a desired distance from the front portion 24, the signals 38 provide an area of detection in the direction of travel 100 sufficient to detect (and subsequently avoid) objects or potential obstructions in the direction of travel 100. Alternatively or additionally, the sensors may be angled toward or away from one another to change the location of the imaginary point (not shown). The signal 38 band may be conical, linear, or any other suitable directed or non-directed emission shape. In other embodiments, the autonomous vacuum cleaner 10 may incorporate one object detection or ultrasonic sensor 36 or three or more object detection or ultrasonic sensors 36. In addition, the signal 38 dispersion angle may differ between sensors 36a, b, and does not need to be the same. For example, one sensor 36 may emit a signal 38 having a first angle $\Delta_1$, and another sensor 36 may emit a signal 38 having a second angle $\Delta_2$, where $\Delta_1$ does not equal $\Delta_2$. The object detection or ultrasonic sensors 36 advantageously detect objects or potential obstructions at a distance away from the autonomous vacuum cleaner 10. Accordingly, as shown in the illustrated embodiments, the ultrasonic sensors 36 replace traditional contact or bump sensors, eliminating intentional physical contact of the autonomous vacuum cleaner 10 with objects, increasing operational life by decreasing intentional impacts.

Referring to FIGS. 2, 4, and 5, the bottom portion 16 carries the nozzle 40. In one embodiment, the nozzle 40 is provided under or on the floor 200 side of the control unit 26. The bottom portion 16 also includes a sloped portion or ramp portion 17 provided at a front portion 24 end of the bottom portion 16. The ramp portion 17 is also provided on the front portion 24 side of the nozzle 40 and extends away from the floor 200. The ramp portion 17 assists the autonomous vacuum cleaner 10 to traverse over different types of floors 200 and to transition between floor 200 materials having different heights, such as a transition between a hardwood floor and a carpet having a greater height than the hardwood floor. In addition, the ramp portion 17 assists with directing the bottom portion 16 upwards, or away from the floor 200, when the autonomous vacuum cleaner 10 climbs an incline.

Figure 8:
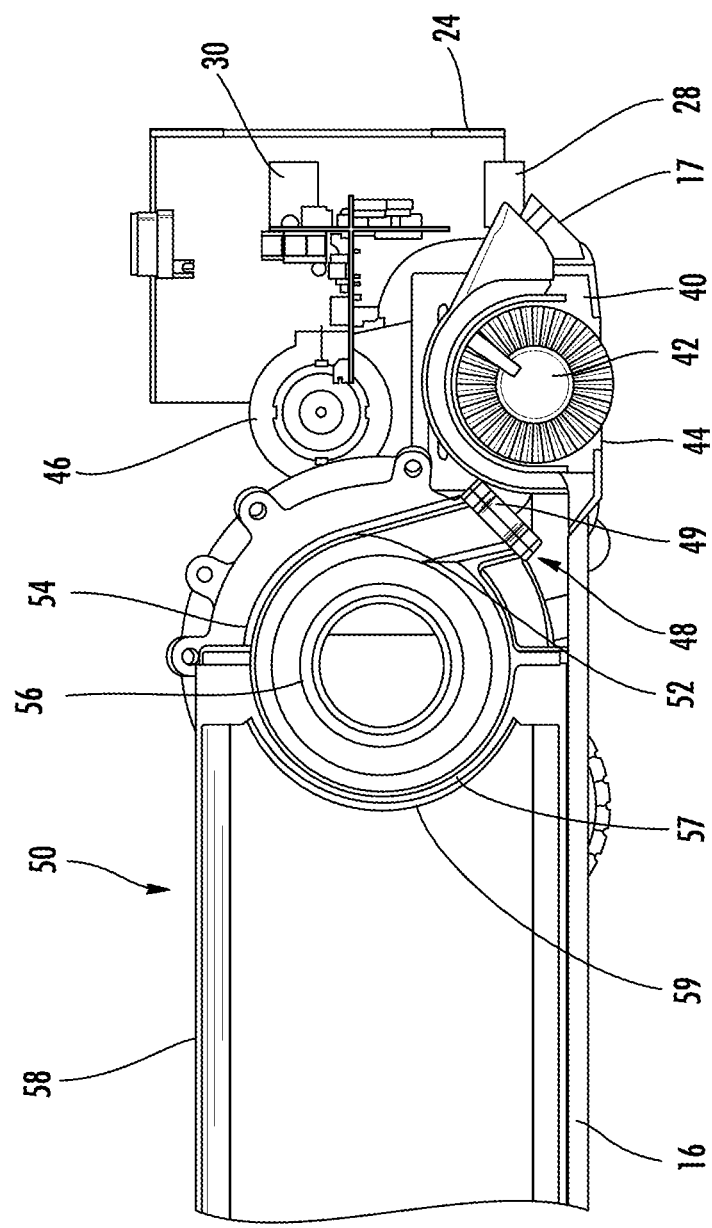
FIG. 8 is a cross-sectional view of the autonomous vacuum cleaner of FIG. 1, taken along line 8-8 of FIG. 2, illustrating a nozzle and a separator assembly.

As shown in FIGS. 4, 5, and 8, the nozzle 40 includes the brush roll 42 that extends through an inlet slot 44 to engage a portion of the floor 200. The brush roll 42 is driven by a brush roll motor 46 by a belt or gear assembly 47 (shown in FIG. 5). The brush roll motor 46 rotates the brush roll 42, such that the brush roll 42 agitates the floor 200 to facilitate dust collection. In one embodiment, the brush roll motor 46 is a reversible motor to drive the brush roll 42 clockwise and counterclockwise (as viewed in FIG. 8). By reversing the brush roll 42 rotation direction, the brush roll 42 can assist with driving the autonomous vacuum cleaner 10 forward, towards the direction of travel 100, or in reverse, away from the direction of travel 100. In other embodiments, the brush roll 42 only rotates in one direction. The length of the brush roll 42 may be between about 75% and 85% of the width of the front portion 24. Alternatively, the length of the brush roll 42 may be between about 85% and 95% of the width of the front portion 24. In yet another embodiment, the length of the brush roll 42 may be between about 75% and 100% of the width of the front portion 24. For reference, the width of the front portion 24 may be defined as the distance along the front portion that extends between the first and second sides 20, 22.

Figure 3:
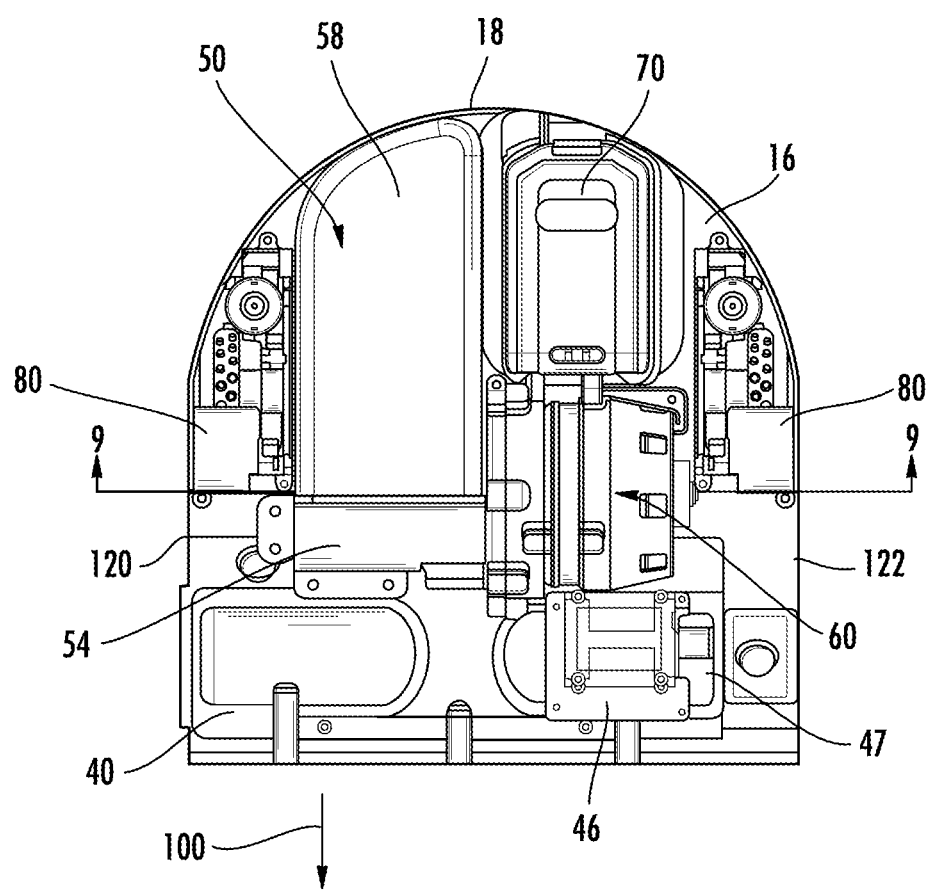
FIG. 3 is a plan view of the autonomous vacuum cleaner of FIG. 1, taken along line 3-3 of FIG. 1, with the housing removed to illustrate the layout of certain internal components.
Figure 18:
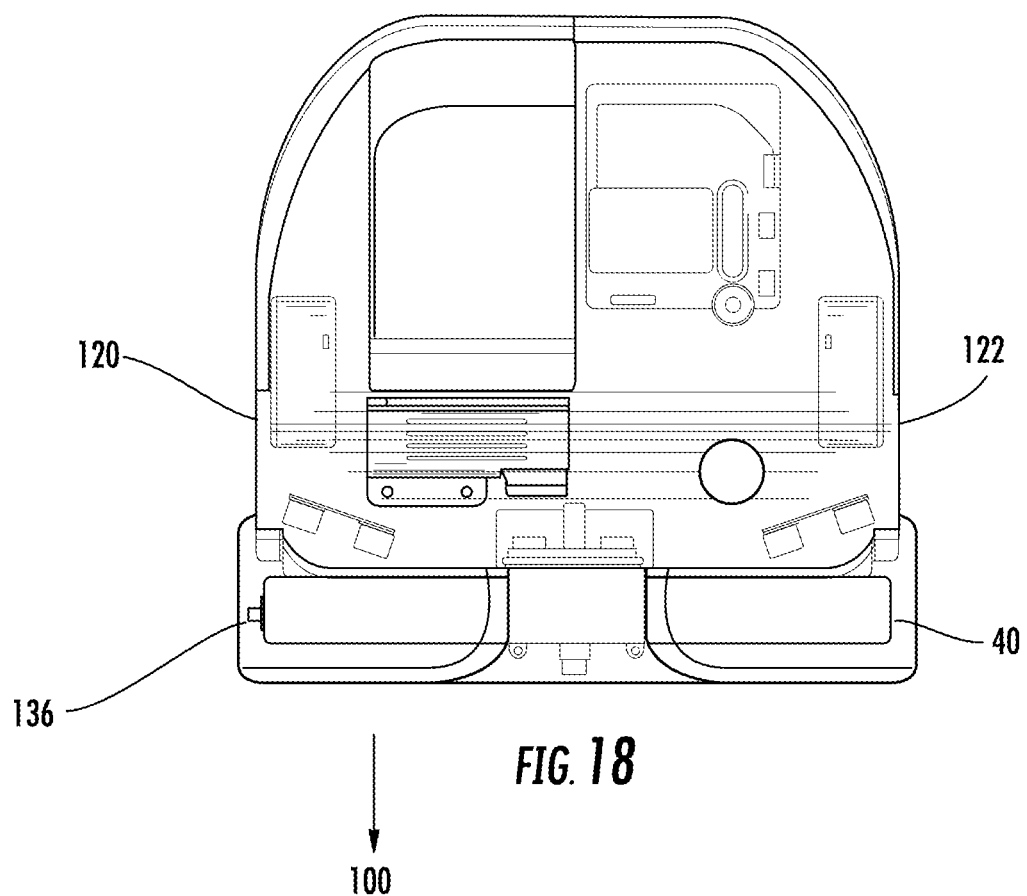
FIG. 18 is a plan view of the autonomous vacuum cleaner of FIG. 1, with a portion of the housing provided as transparent and illustrating a wall follow sensor.

Referring now to FIGS. 2 and 3, the nozzle 40 may be laterally offset on the bottom portion 16, positioned closer to the first side 120 than the second side 122. The nozzle 40 may be offset closer to the first side 120 to accommodate the belt or gear assembly 47 that drives the brush roll 42. By having the nozzle 40 closer to the first side or dominant side 120, the control unit 26 will operate the autonomous vacuum cleaner 10 such that the dominant side 120 will follow or track a wall or other obstacle in the environment the autonomous vacuum cleaner 10 operates. The nozzle 40 will vacuum dust along the wall or other obstacle, minimizing an unvacuumed portion of the floor 200 between the wall (or obstacle) and the nozzle 40. To assist the autonomous vacuum cleaner 10 with following or tracking a wall or other obstacle, a wall follow sensor 136 (see FIG. 18) may be provided on the first side or dominant side 120 of the autonomous vacuum cleaner 10. The wall follow sensor 136 is illustrated as positioned on the nozzle 40, but may be provided at any location suitable for operation. The wall follow sensor 136 has a sensor emission that is at an angle to the direction of travel 100, such as approximately orthogonal to the direction of travel 100. The wall follow sensor 136 may be any suitable detection device, including, but not limited to, a visible or nonvisible light based sensor (laser, infrared, etc.) or a sound based sensor (ultrasonic, etc.). In other embodiments, the autonomous vacuum cleaner 10 may not include a dominant side, as the nozzle 40 may extend from the first side 120 to the second side 122 of the autonomous vacuum cleaner 10.

The nozzle 40 is in direct fluid connection with a separator assembly 50 by a conduit 48. Referring to FIG. 8, the conduit 48 is partially defined by a nozzle outlet 49 and a separator inlet 52. The separator inlet 52 may removably engage the conduit 48, or alternatively, the conduit 48 may removably engage the nozzle outlet 49, to facilitate removal of the separator assembly 50 from the autonomous vacuum cleaner 10. The separator inlet 52 may be an inlet aperture in the separator, or may include a duct or other portion of the separator 54 housing that extends away from the separator 54.

In the illustrated embodiment, the conduit 48 extends upward, or away from the floor 200, to the separator 54. The conduit 48 is preferably as short of a distance as possible and has as few bends as possible in order to maximize the suction or air flow from the nozzle 40 to the separator 54. For example, the conduit 48 has no more than one bend. In one embodiment, illustrated in FIG. 16, the separator 54 is a cyclonic separator having a cyclone diameter $D_c$. The horizontal distance $D_1$ from the nozzle outlet 49 to the separator inlet 52, as measured along the direction of travel 100, is between about 0.1 and 0.5 times the cyclone diameter $D_c$. The distance $D_2$ from the nozzle outlet 49 to the separator inlet 52, as measured along the conduit 48, is between about 0.8 and 1.2 times the cyclone diameter $D_c$. More particularly, the distance $D_2$ from the nozzle outlet 49 to the separator inlet 52 may be less than about one cyclone diameter $D_c$.

Figure 9:
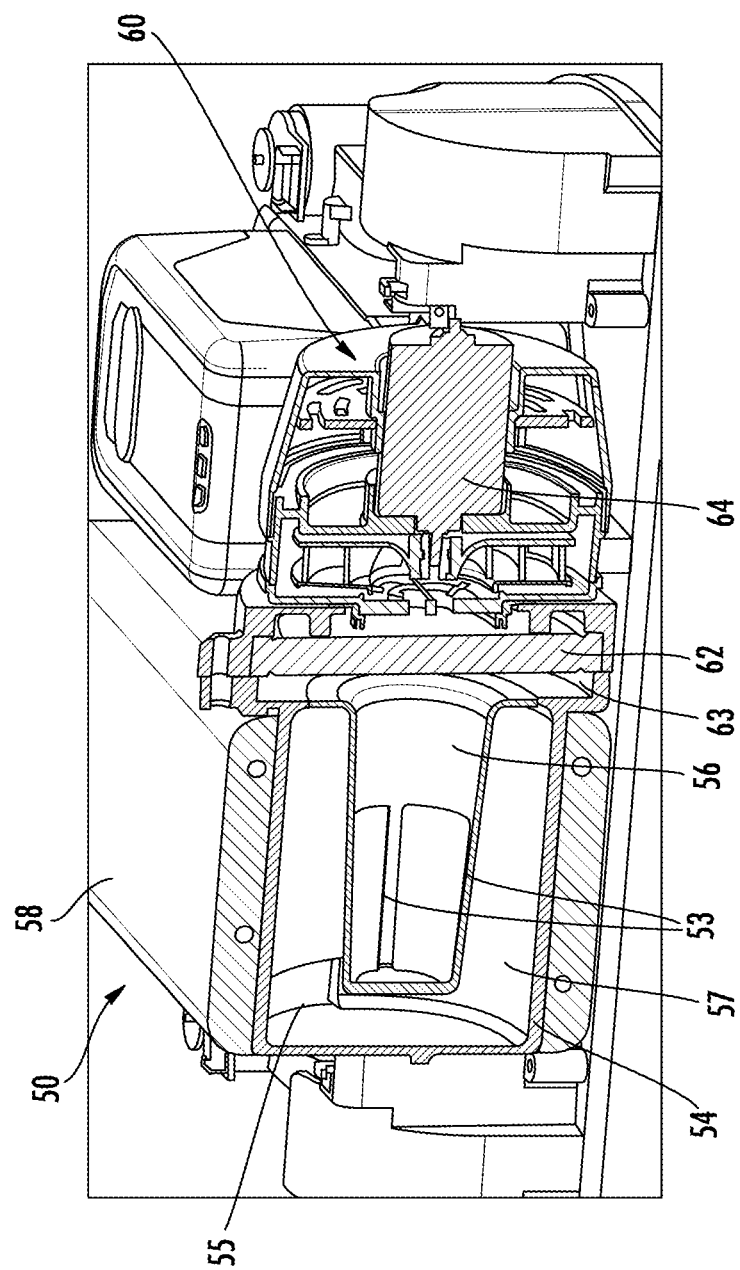
FIG. 9 is a cross-sectional view of the autonomous vacuum cleaner of FIG. 1, taken along line 9-9 of FIG. 3, illustrating the separator, shroud, and motor assembly.

Referring now to FIGS. 8 and 9, the separator assembly 50 includes the separator 54, an outlet shroud 56, and a dust cup or dust bin 58. The separator 54 receives a portion of the air outlet shroud 56, which may be removable from the separator 54. The dust bin 58 is in fluid connection with the separator 54. In the illustrated embodiment, the separator 54 is a cyclonic separator having a cylindrical sidewall 57 about a separator axis 154 (shown in FIG. 7). Referring to FIG. 7, the separator axis 154 is transverse to a longitudinal axis of the dust bin 158. The separator 54 may be generally perpendicular to the longitudinal axis of the dust bin 158. In addition, the separator axis 154 is generally parallel to a longitudinal axis through the nozzle 142, for example through the brush roll 42 (as shown in FIG. 16).

Figure 16:
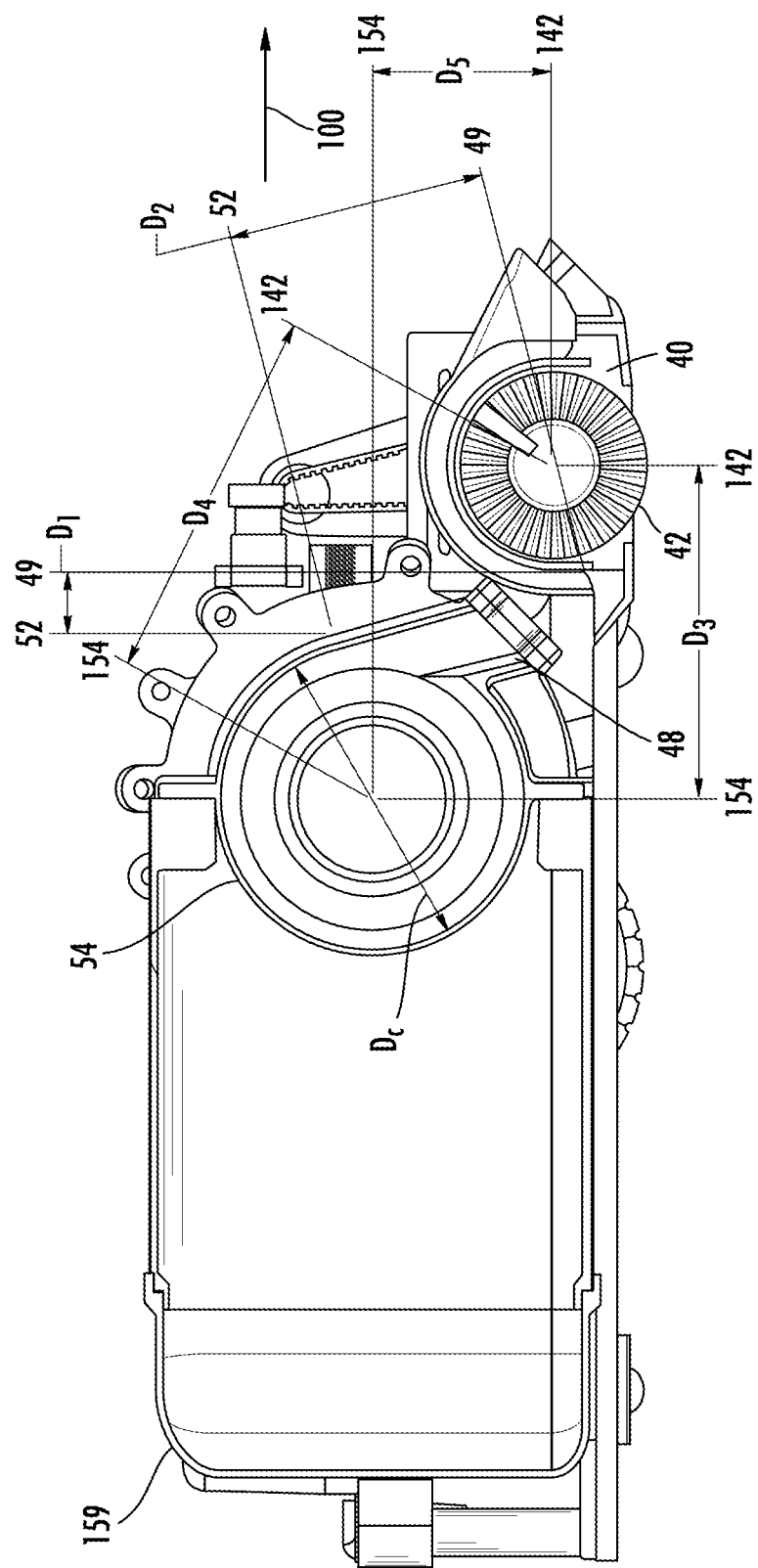
FIG. 16 is a partial side cross-sectional view of an embodiment of the autonomous vacuum cleaner of FIG. 1 illustrating the separator assembly and associated dimensions of the nozzle, conduit, and separator.

Referring to FIG. 16, in the illustrated embodiment, the horizontal distance $D_3$ between the separator axis 154 and the longitudinal axis through the nozzle 142, as measured along the direction of travel 100, is between about 0.4 and about 1.5 times the cyclone diameter $D_c$, and more specifically is between about 1.0 and about 1.2 times the cyclone diameter $D_c$. In another alternative embodiment, the horizontal distance $D_3$ between the separator axis 154 and the longitudinal axis through the nozzle 142, as measured along the direction of travel 100, is between about 0.8 and about 1.5 times the cyclone diameter $D_c$.

The distance $D_4$ from the separator axis 154 and the longitudinal axis through the nozzle 142 is between about 1.0 and 1.5 times the cyclone diameter $D_c$. The vertical distance $D_5$ between the separator axis 154 and the longitudinal axis through the nozzle 142, as measured approximately perpendicular to the direction of travel 100, is between about 0.4 and 0.8 times the cyclone diameter $D_c$.

Referring back to FIGS. 8 and 9, the separator 54 is illustrated as a reverse air flow cyclonic separator, with the separator inlet 52 and air outlet shroud 56 provided on the same end of the separator 54, and a dust discharge aperture 55 (see FIG. 9) provided on an opposite end of the separator 54. In the illustrated embodiment, the separator inlet 52 and the outlet shroud 56 are provided closer to a motor assembly 60 than the dust discharge aperture 55. As best illustrated in FIG. 8, the separator 54 is defined by the substantially cylindrical sidewall 57. The dust bin 58 may include an arcuate or curved wall 59 that removably engages a portion of the cylindrical sidewall 57 of the separator 54. The dust discharge aperture 55 extends through a portion of the cylindrical sidewall 57 and a portion of the curved wall 59 to provide a fluid connection between the separator 54 and the dust bin 58. The dust bin 58 and the separator 54 may be removed together as a unit, or may be removed separately. In other embodiments, the curved wall 59 of the dust bin 58 may be omitted and the cylindrical sidewall 57 of the separator 54 forms an end of the dust bin 58. The fluid connection between the separator 54 and dust bin 58 allows dust separated from dirty air in the separator 54 to exit the separator 54 and enter the dust bin 58 for collection and later disposal. As shown in FIG. 9, the shroud 56 includes a plurality of air flow apertures 53 to discharge clean air from the separator 54.

FIG. 1 illustrates the separator assembly 50 in relation to the autonomous vacuum cleaner 10. In the illustrated embodiment, the separator assembly 50 defines a portion of the housing 12. More specifically, a portion of the dust bin 58 defines a portion of the top portion 14 and arcuate portion 18 of the housing 12. The top portion of the housing 12 may include one or more channels 15 to allow a user to grasp the separator assembly 50 and remove it from the top portion 14 of the autonomous vacuum cleaner 10. Alternatively, the separator assembly 50 may be enclosed within the housing 12.

Figure 10:
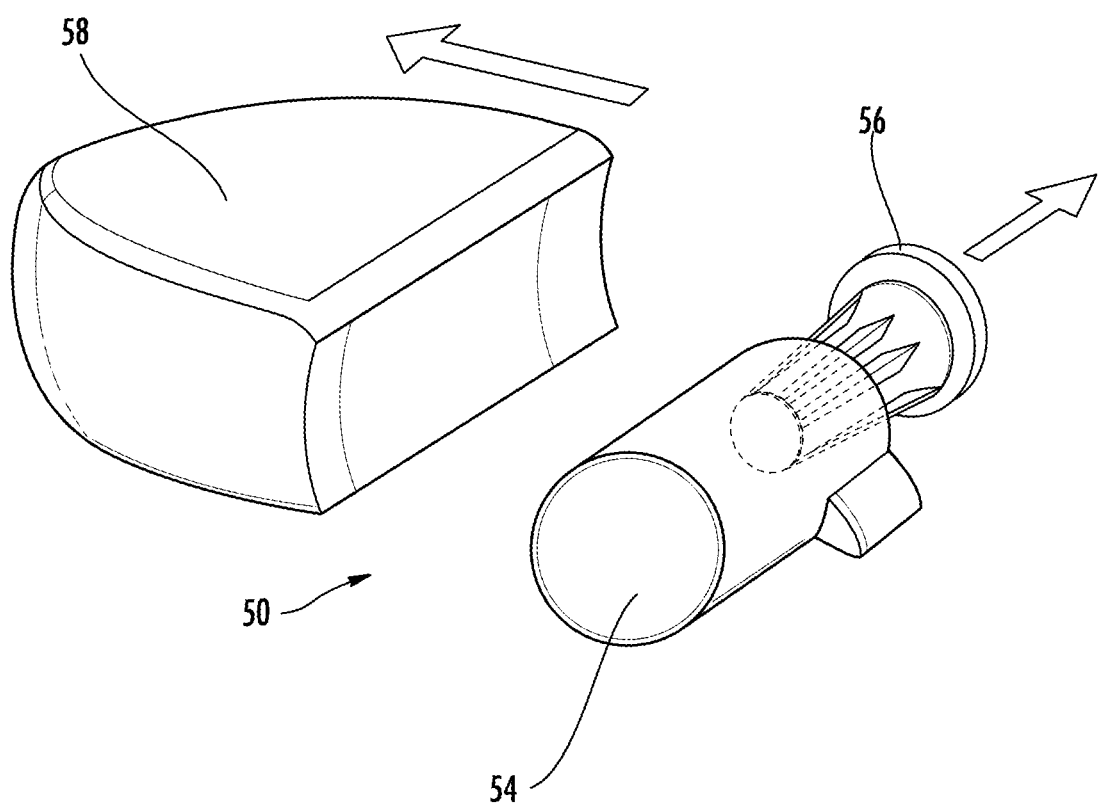
FIG. 10 is an isometric view illustrating disassembly of the separator assembly for use in the autonomous vacuum cleaner of FIG. 1.
Figure 19:
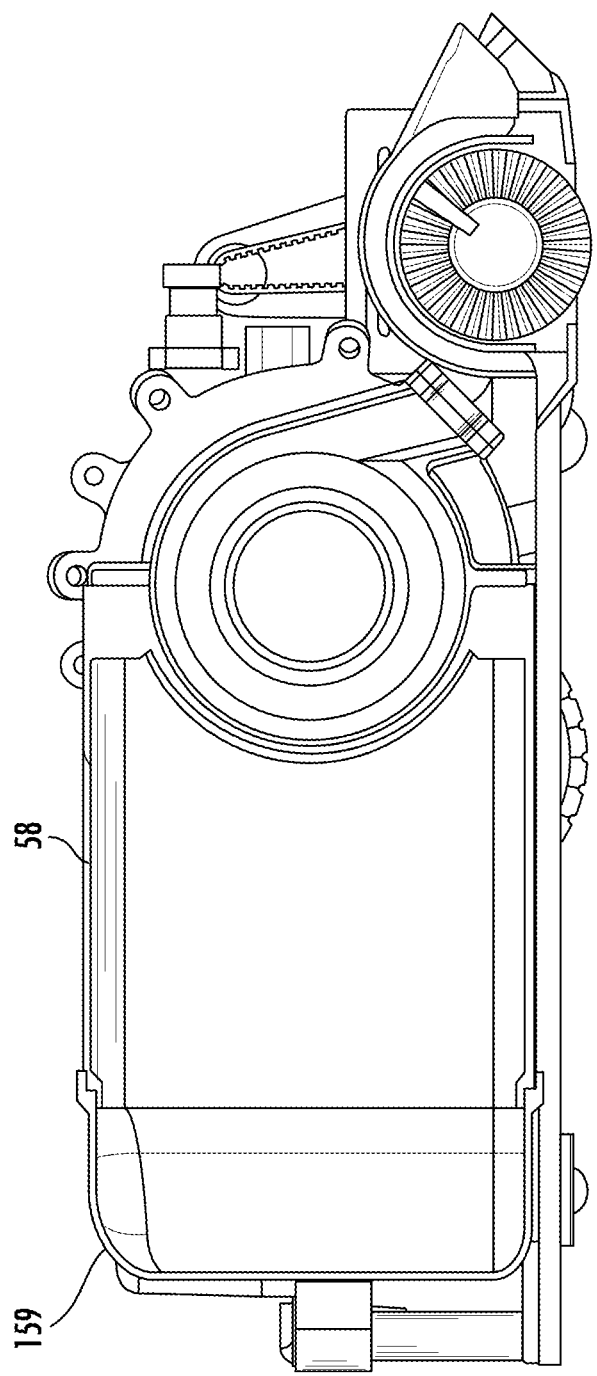
FIG. 19 is a partial side cross-sectional view of an embodiment of the autonomous vacuum cleaner of FIG. 1 illustrating the dust bin having a removable door.

Once removed from the autonomous vacuum cleaner 10, the modular separator assembly 50 may be easily disassembled. Referring to FIG. 10, the dust bin 58 is detachable from the separator 54 in a first direction. Once detached, a user is free to empty any dust collected in the dust bin 58. In addition, the shroud 56 may be removed from the separator 54 in a second direction, approximately perpendicular to the first direction. By removing the shroud 56, a user has access to the inside of the separator 54, allowing for additional cleaning and removal of any dust in the separator 54. In other embodiments, and as illustrated in FIG. 19, the dust bin 58 includes an access door or cap 159. The door 159 may define a portion of the dust bin 58 body and provide access to empty the dust bin 58. The illustrated door 159 has an interference fit with the dust bin 58 body to facilitate removal of the door 159 from the dust bin 58. However in other embodiments, the door 159 may be connected to the dust bin 58 in any suitable manner to provide access to empty the dust bin 58.

Referring back to FIG. 9, the separator 54 is removably connected to the motor assembly 60. A filter medium 62 for filtering clean air discharged by the separator 54 is provided in a filter chamber 63 between the separator 54 and a suction motor and fan assembly 64. The clean air drawn through the filter 62 may be used to cool the suction motor and fan assembly 64 prior to being discharged as exhaust. The suction motor and fan assembly 64 has an axis of rotation with the fan rotatable about the axis of rotation to generate a vacuum air flow. The axis of rotation may be along the separator axis 154 (shown in FIG. 7), as the cyclonic separator 54 and the air outlet shroud 56 is each coaxial with the motor assembly 60, motor and fan assembly 64, and the filter chamber 63.

In the embodiment of the separator 54 illustrated in FIG. 9, the filter medium 62 is provided in the motor assembly 60 and remains with the motor assembly 60 when the separator 54 is removed from the autonomous vacuum cleaner 10. This allows a user to visually inspect and ascertain the cleanliness of the filter 62 when the separator assembly 50, and specifically the separator 54, is removed as the dirty side of the filter 62 is visible to the user.

Figure 17:
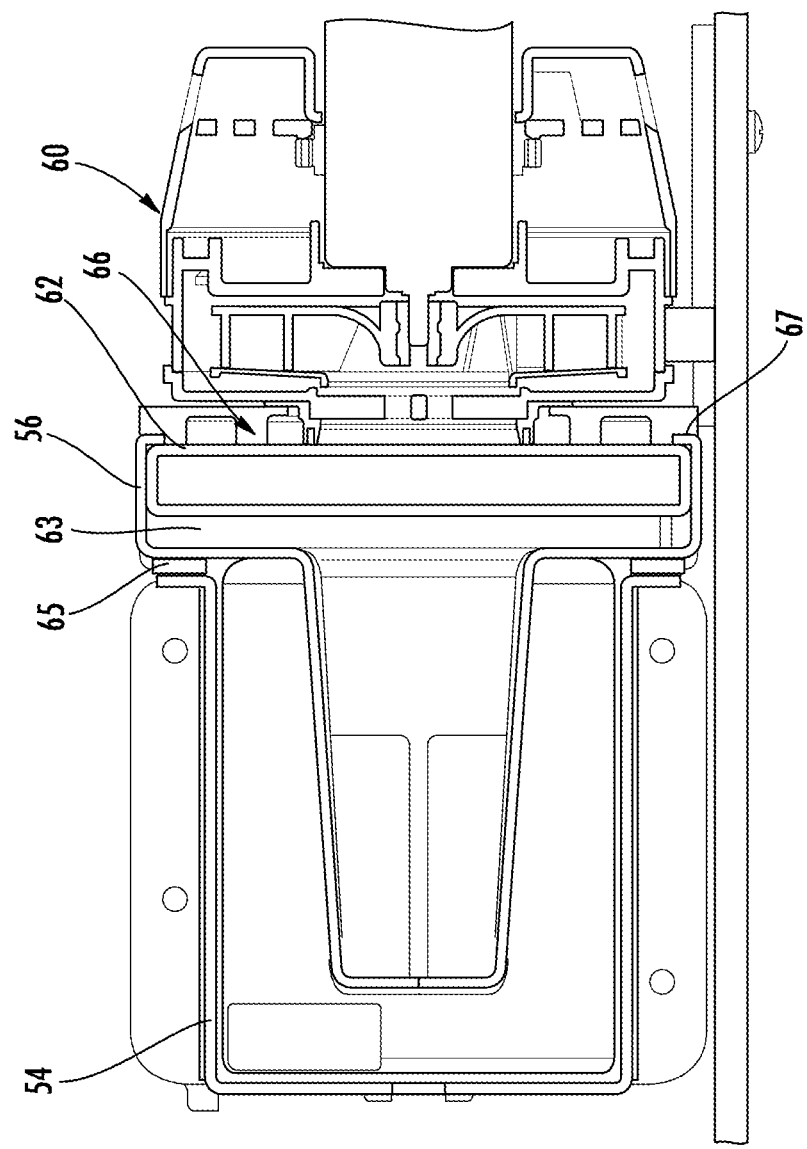
FIG. 17 is a partial cross-sectional view of an embodiment of a separator and motor assembly arrangement where a filter chamber is defined by a portion of the separator.

In a second embodiment of the separator 54 illustrated in FIG. 17, the filter chamber 63 is defined by a portion of the shroud 56. The filter medium 62 may partially extend into or be completely retained by the shroud 56 at a clean air outlet end 66 of the separator 54. The filter medium 62 remains with the shroud 56 when the separator 54 is removed from the autonomous vacuum cleaner 10. Thus, the shroud 56 may remain with the separator 54 or remain in the autonomous vacuum cleaner 10 when the separator 54 is removed. To assist with retaining the filter medium 62, the shroud 56 includes a flange 67 that contacts the filter medium 62. The flange 67 may be provided about a portion, up to an entirety, of a circumference of the shroud 56 at the clean air outlet end 66. A seal 65 may be provided between the separator 54 and the shroud 56 to avoid uncontrolled air discharge during operation.

In a third embodiment of the separator 54, the filter chamber 63 is defined by a portion of the separator 54. The filter medium 62 may partially extend into or be completely retained by the separator 54 and removed with the separator 54. The flange 67 may be provided about a portion, up to an entirety, of a circumference of the separator 54 at the clean air outlet end 66. The shroud 67 may be optional, with the shroud 67 being received by the separator 54.

FIGS. 2 and 3 illustrate a battery 70 carried by the bottom portion 16. The battery 70 is a rechargeable battery that provides electricity to operate the components described herein. In one embodiment, the battery 70 is not removable from the autonomous vacuum cleaner 10. The battery 70 is recharged by the autonomous vacuum cleaner 10 establishing an electrical connection with a power source (not shown), such as a charging station or an electrical outlet. In other embodiments, the battery 70 may be removable from the autonomous vacuum cleaner 10 to facilitate charging or recharging in a remote charging station, or battery 70 replacement. In either event, contacts (not shown) may be provided on the outer housing 12 that engage corresponding contacts (not shown) on the charging station (not shown). The contacts on the outer housing 12 are positioned such that they engage the contacts on the charging station when the autonomous vacuum cleaner 10 drives up to and connects with the charging station.

Figure 13:
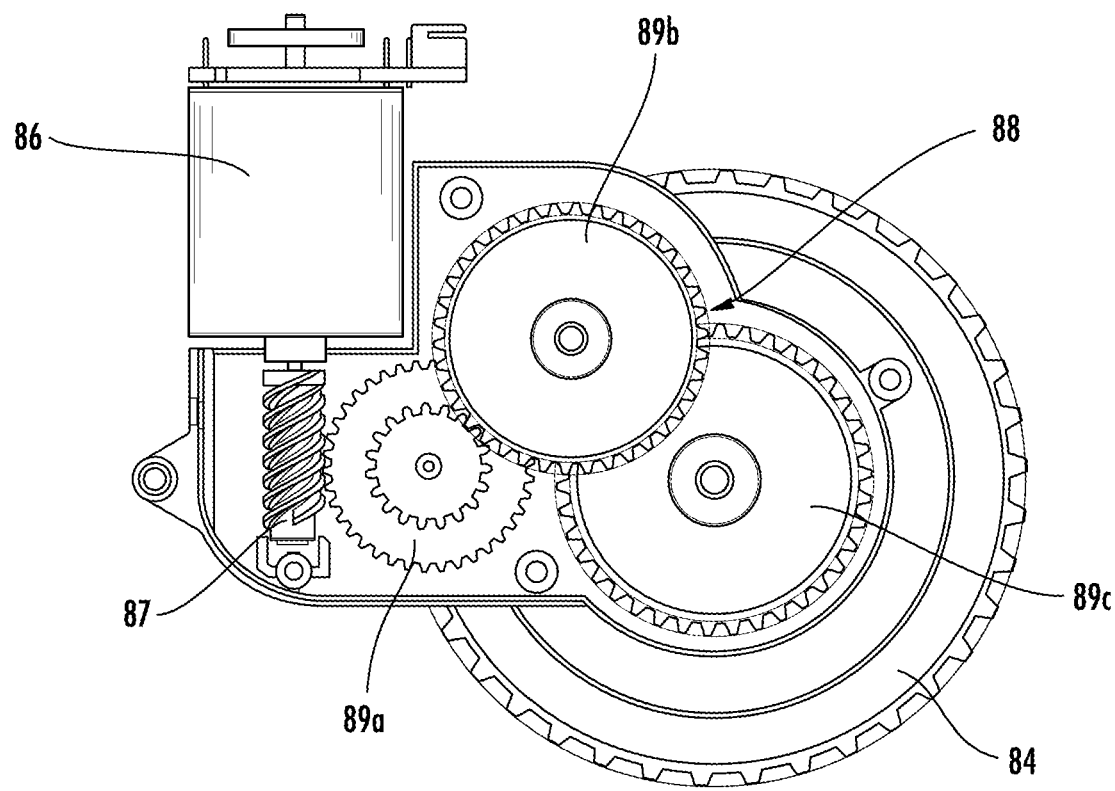
FIG. 13 is a cross-sectional view of the wheel assembly of FIG. 11, taken along line 13-13 of FIG. 12, illustrating the drive and gear assembly.

FIGS. 11-13 illustrate an embodiment of an automatic wheel assembly 80 for use with the autonomous vacuum cleaner 10. The wheel assembly 80 includes a housing 82 that supports a wheel 84 coupled to a drive 86 by a gear assembly 88. Referring to FIG. 13, the gear assembly 88 includes one or more gears 89a, b, c and a worm gear 87. The drive 86 rotates the worm gear 87 that meshes with a first gear 89a, rotating the additional gears 89b, c as desired to rotate the wheel 84. The gears 89a, b, c have a gear ratio suitable to translate rotation of the worm gear 87 into rotation of the wheel 84, and subsequent lateral motion of the autonomous vacuum cleaner 10. It should be appreciated that rotation of the worm gear 87 in a first direction results in a first lateral motion of the autonomous vacuum cleaner 10, while rotation of the worm gear 87 in a second direction, opposite the first direction, results in a second lateral motion of the autonomous vacuum cleaner 10 that is opposite the first lateral motion. In the embodiments illustrated in FIGS. 2-5, the autonomous vacuum cleaner 10 includes two wheel assemblies 80. However, in other embodiments, one wheel assembly 80 or three or more wheel assemblies 80 may be incorporated into the autonomous vacuum cleaner 10.

While the plurality of wheel assemblies 80, and optionally assisted by the brush roll 42, drive the autonomous vacuum cleaner 10, the autonomous vacuum cleaner 10 also includes a plurality of non-driven wheels 90, 92. As shown in FIGS. 4-5, a first non-driven wheel 90 is provided between the brush roll 42 and the wheel assemblies 80, while a second non-driven wheel 90 is provided between the wheel assemblies 80 and a rear 19 of the bottom portion 16, the rear 19 provided on an opposite end of the bottom portion 16 as the ramp portion 17. The non-driven wheels 90, 92 may be casters, and assist with balance and stability during operation of the autonomous vacuum cleaner 10. In other embodiments, the autonomous vacuum cleaner 10 may include one non-driven wheel, three or more non-driven wheels, or zero non-driven wheels.

The autonomous vacuum cleaner 10 provides advantages over known autonomous vacuums in the art. By utilizing object detection sensors 36 to detect objects or potential obstructions at a distance away from the autonomous vacuum cleaner 10, intentional physical contact with objects necessary for traditional contact or bump sensors is eliminated. This increases operational life by reducing unnecessary impacts. In addition, the modular separator assembly 50 provides for easy and efficient removal from the autonomous vacuum cleaner 10 to facilitate emptying of the dust bin 58, and easy access to clean the separator 54. Further, the ramp portion 17 of the bottom portion 16 advantageously assists the autonomous vacuum cleaner 10 to climb inclines and traverse floor 200 materials having different heights, as the ramp portion 17 guides the bottom portion 16 upwards or away from the floor 200. These and other advantages may be realized from one or more embodiments of the autonomous vacuum cleaner 10 disclosed herein.

What is claimed is:

1. An autonomous vacuum cleaner comprising:
a housing with one or more of a controller, a sensor, and an automatic wheel assembly operable in combination to sense a surrounding environment and to navigate about the surrounding environment to perform a surface cleaning operation without continuous human input;
a suction nozzle;
a suction motor and a fan assembly operable to generate an airflow through the vacuum cleaner from the suction nozzle through a debris separator to a clean air exhaust,
the suction motor and the fan assembly having an axis of rotation and a fan of the fan assembly rotatable about the axis of rotation, the axis of rotation orientated horizontally,
the debris separator including a cyclonic separator operable to separate debris from the airflow, the cyclonic separator including,
a cylindrical wall along a longitudinal axis, the longitudinal axis of the cyclonic separator being orientated horizontally, and
wherein the suction nozzle is along a longitudinal axis generally parallel to the longitudinal axis of the cyclonic separator.

2. The autonomous vacuum cleaner of claim 1, wherein the cylindrical wall includes a first end and a second end, the longitudinal axis extending through the first end and the second end, and wherein the axis of rotation extends through the first end and the second end of the cylindrical wall.

3. The autonomous vacuum cleaner of claim 2, wherein the cyclonic separator further includes, a dirty air inlet, a clean air outlet, a debris outlet adjacent the second end of the cylindrical wall, and a dust bin in fluid communication with the debris outlet of the cyclonic separator.

4. The autonomous vacuum cleaner of claim 2, where the longitudinal axis of the cyclonic separator is coaxial with the axis of rotation of the motor and fan assembly.

5. The autonomous vacuum cleaner of claim 1, wherein the axis of rotation of the motor and fan assembly is generally parallel to the longitudinal axis of the suction nozzle.

6. The autonomous vacuum cleaner of claim 1, wherein the cyclonic separator has a cyclone diameter, and a horizontal distance between the longitudinal axis of the cyclonic separator and the longitudinal axis through the nozzle along a direction of travel is between about 0.4 and about 1.5 times the cyclone diameter.

7. The autonomous vacuum cleaner of claim 1, further comprising a dust bin in fluid communication with the cyclonic separator, wherein the longitudinal axis of the cyclonic separator is transverse to a longitudinal axis of the dust bin.

8. The autonomous vacuum cleaner of claim 1, wherein the cyclonic separator has a cyclone diameter, and a distance from the longitudinal axis of the nozzle to the longitudinal axis of the separator is between about 0.4 and 1.5 times the cyclone diameter.

9. The autonomous vacuum cleaner of claim 1, further comprising a filter positioned between the cyclonic separator and the suction motor and fan assembly to filter air discharged from the separator.

10. The autonomous vacuum cleaner of claim 1, wherein the cyclonic separator is removably connected to the suction source.

11. The autonomous vacuum cleaner of claim 1, wherein the cyclonic separator further includes a first end wall located at the first end of the cylindrical wall, and wherein a clean air outlet extends through the first end wall of the cyclonic separator.

12. The autonomous vacuum cleaner of claim 11, wherein the cyclonic separator further includes a second end wall defining a portion of a debris outlet.

13. The autonomous vacuum cleaner of claim 1, where the cyclonic separator includes a clean air outlet, wherein the clean air outlet includes a perforated tube located within the cylindrical wall.

14. The autonomous vacuum cleaner of claim 1, further comprising a battery that provide power to the suction motor, wherein the battery is removable from the autonomous vacuum cleaner to facilitate recharging the battery.

15. The autonomous vacuum cleaner of claim 1, further comprising a brush roll adjacent the suction nozzle.

16. The autonomous vacuum cleaner of claim 15, wherein the brush roll rotates in a first direction to facilitate forward movement of the autonomous vacuum cleaner and the brush roll rotates in a second direction, opposite the first direction, to facilitate backward movement of the autonomous vacuum cleaner.

17. An autonomous vacuum cleaner comprising:
a housing with one or more of a controller, a sensor, and an automatic wheel assembly operable in combination to sense a surrounding environment and to navigate about the surrounding environment to perform a surface cleaning operation without continuous human input;
a suction nozzle;
a suction motor and a fan assembly operable to generate an airflow through the vacuum cleaner from the suction nozzle through a debris separator to a clean air exhaust,
the suction motor and the fan assembly having an axis of rotation and a fan of the fan assembly rotatable about the axis of rotation, the axis of rotation orientated horizontally,
the debris separator including a cyclonic separator operable to separate debris from the airflow, the cyclonic separator including,
a cylindrical wall along a longitudinal axis, the longitudinal axis of the cyclonic separator being orientated horizontally, and
a dust bin in fluid communication with the cyclonic separator, wherein the longitudinal axis of the cyclonic separator is transverse to a longitudinal axis of the dust bin.

18. An autonomous vacuum cleaner comprising:
a housing with one or more of a controller, a sensor, and an automatic wheel assembly operable in combination to sense a surrounding environment and to navigate about the surrounding environment to perform a surface cleaning operation without continuous human input;
a suction nozzle;
a suction motor and a fan assembly operable to generate an airflow through the vacuum cleaner from the suction nozzle through a debris separator to a clean air exhaust,
the suction motor and the fan assembly having an axis of rotation and a fan of the fan assembly rotatable about the axis of rotation, the axis of rotation orientated horizontally,
the debris separator including a cyclonic separator operable to separate debris from the airflow, the cyclonic separator including,
a cylindrical wall along a longitudinal axis, the longitudinal axis of the cyclonic separator being orientated horizontally,
wherein the cyclonic separator further includes a first end wall located at the first end of the cylindrical wall, and wherein a clean air outlet extends through the first end wall of the cyclonic separator, and
wherein the cyclonic separator further includes a second end wall defining a portion of a debris outlet.

19. The autonomous vacuum cleaner of claim 18, further comprising a perforated tube located within the cylindrical wall, the perforated tube extending from the first end wall of the cyclonic separator forming the clean air outlet, and wherein the perforated tube is removable with the first end wall when the separator is removed from the suction motor and fan assembly.

20. The autonomous vacuum cleaner of claim 18, wherein a dirty air inlet of the cyclonic separator is adjacent the first end of the cylindrical wall.

21. The autonomous vacuum cleaner of claim 20, wherein the dirty air inlet extends through the cylindrical wall.

* * * * *